United States Patent
Bogner et al.

(10) Patent No.: US 9,512,739 B2
(45) Date of Patent: Dec. 6, 2016

(54) TURBOCHARGER WITH COOLED TURBINE HOUSING

(75) Inventors: Mathias Bogner, Neutraubling (DE); Ralph-Maurice Koempel, Mannheim (DE); Marc Hiller, Morschheim (DE)

(73) Assignee: Continental Automotive GmbH, Hannover (DE)

( * ) Notice: Subject to any disclaimer, the term of this patent is extended or adjusted under 35 U.S.C. 154(b) by 540 days.

(21) Appl. No.: 13/984,893

(22) PCT Filed: Feb. 8, 2012

(86) PCT No.: PCT/EP2012/052113
§ 371 (c)(1),
(2), (4) Date: Aug. 12, 2013

(87) PCT Pub. No.: WO2012/107479
PCT Pub. Date: Aug. 16, 2012

(65) Prior Publication Data
US 2013/0323020 A1    Dec. 5, 2013

(30) Foreign Application Priority Data
Feb. 10, 2011    (DE) .................. 10 2011 003 907

(51) Int. Cl.
| F01D 25/14 | (2006.01) |
| F02C 6/12 | (2006.01) |
| F02B 37/18 | (2006.01) |
| F04D 29/40 | (2006.01) |
| F02B 39/00 | (2006.01) |

(52) U.S. Cl.
CPC ............... *F01D 25/14* (2013.01); *F02B 37/18* (2013.01); *F02B 39/005* (2013.01); *F02C 6/12* (2013.01); *Y02T 10/144* (2013.01)

(58) Field of Classification Search
CPC ......... F01D 25/14; F02B 37/18; F02B 39/005; F02C 6/12; Y02T 10/144
USPC ............................................ 60/602; 415/180
See application file for complete search history.

(56) References Cited

U.S. PATENT DOCUMENTS

| 4,756,673 A | 7/1988 | Miyashita et al. |
| 6,513,328 B2 | 2/2003 | Baeuerle et al. |
| 8,459,024 B2 | 6/2013 | Koch |
| 2001/0029570 A1 | 10/2001 | Yamamoto et al. |
| 2004/0083730 A1 | 5/2004 | Wizgall et al. |
| 2009/0101087 A1 | 4/2009 | Ueno et al. |
| 2011/0008158 A1 | 1/2011 | Boening et al. |
| 2011/0252775 A1 | 10/2011 | Joergl et al. |

FOREIGN PATENT DOCUMENTS

| CN | 101960099 A | 1/2011 |
| DE | 7627763 U1 | 12/1977 |
| DE | 10025500 A1 | 11/2001 |
| DE | 20311703 U1 | 11/2003 |
| DE | 10344868 A1 | 4/2005 |

(Continued)

*Primary Examiner* — Kenneth Bomberg
*Assistant Examiner* — Dapinder Singh
(74) *Attorney, Agent, or Firm* — Laurence A. Greenberg; Werner H. Stemer; Ralph E. Locher

(57) ABSTRACT

A turbocharger has a turbine housing, a bearing housing, and a compressor housing. The turbine housing has a coolant inlet, a cooling jacket formed in the interior of the turbine housing, and a coolant outlet. The cooling jacket is divided into two subregions.

11 Claims, 3 Drawing Sheets

(56) References Cited

FOREIGN PATENT DOCUMENTS

| | | | |
|---|---|---|---|
| GB | 2 234 290 | * | 1/1991 |
| JP | 2010196478 A | | 9/2010 |
| WO | 2009/019153 A2 | | 2/2009 |
| WO | 2009/106159 A1 | | 9/2009 |
| WO | 2010039590 A2 | | 4/2010 |

* cited by examiner

TURBOCHARGER WITH COOLED TURBINE HOUSING

BACKGROUND OF THE INVENTION

Field of the Invention

The invention relates to an exhaust-gas turbocharger which has a cooled turbine housing.

Exhaust-gas turbochargers serve for improving the efficiency of an internal combustion engine and thus increasing the power thereof. For this purpose, the exhaust-gas turbocharger has a turbine with a turbine wheel and has a compressor with a compressor wheel, wherein the two rotor wheels are arranged on a common shaft. Here, the turbine wheel is driven by an exhaust-gas mass flow from a connected internal combustion engine, and in turn drives the compressor wheel. The compressor compresses inducted fresh air and conducts said fresh air to the internal combustion engine. The common shaft is mounted in a bearing housing of the turbocharger. Furthermore, the turbine wheel of the turbine is arranged in a turbine housing, and the compressor wheel of the compressor is arranged in a compressor housing.

An exhaust-gas turbocharger of said type must satisfy a wide variety of requirements during operation on the internal combustion engine or on an engine connected thereto. One of said requirements consists in accommodating the high temperatures which can arise in the turbocharger housing for example owing to the hot exhaust-gas mass flow.

Here, the conventional construction of an exhaust-gas turbocharger provides individual housings which are composed in each case of a material suited to the temperature prevailing there. Here, the compressor housing is normally composed of aluminum, whereas the bearing housing is composed of cast iron, wherein the bearing housing may additionally also be designed to be water-cooled. The turbine housing is generally composed, owing to the high temperatures that prevail in said region, of high-temperature-resistant nickel alloys. Owing to the different, suited materials for the individual housings, said housings are formed as separate parts which are connected to one another and which must furthermore be sealed off with respect to one another.

High-pressure-resistant nickel alloys represent a considerable cost factor. Thus, owing to the high material costs, the turbine housing constitutes the most expensive single item in the overall costs of an exhaust-gas turbocharger.

FIG. 1 shows the price development for nickel and aluminum in the last five years. The use of cheaper cast materials for the turbine housing, such as for example aluminum alloys, would considerably reduce the overall costs of an exhaust-gas turbocharger. Said materials are however considerably less temperature-resistant than nickel alloys.

BRIEF SUMMARY OF THE INVENTION

It is the object of the invention to specify an exhaust-gas turbocharger whose turbine housing, even without the use of nickel alloys, withstands the high temperatures occurring during operation.

Said object is achieved by means of an exhaust-gas turbocharger having the features as claimed. The dependent claims specify advantageous embodiments and refinements of the invention.

According to the present invention, an exhaust-gas turbocharger comprises a turbine housing, a bearing housing and a compressor housing, wherein the turbine housing has a coolant inlet, a cooling jacket arranged in the interior of the turbine housing, and a coolant outlet, wherein the cooling jacket is divided into two subregions.

In an exhaust-gas turbocharger of said type, active cooling of the turbine housing is preferably realized using tubular connections which, within the turbine housing, connect the two subregions of the cooling jacket to one another.

As a result of the division of the cooling jacket into two subregions, it is advantageously made possible to optimize the guidance of the flow of the coolant within the turbine housing, and to ensure here that thermally particularly highly loaded constituent parts of the turbine housing are cooled in an improved manner. In particular, by means of the claimed division of the cooling jacket into multiple subregions, it can be ensured that regions which are particularly critical from a thermal aspect, and which include the region of the spiral upstream of the turbine wheel and the outflow region of the turbine wheel, are adequately cooled at all operating points of the associated internal combustion engine. If the exhaust-gas turbocharger has a wastegate, then it can be ensured by means of the present invention that the wastegate duct and the region around the wastegate seat are also cooled in an improved manner.

A further advantage of the invention consists in that gases formed within the cooling jacket cannot collect in the turbine housing, but rather can exit the turbine housing both during engine operation and also when the internal combustion engine is at a standstill.

Further advantageous properties of the invention will emerge from the exemplary explanation thereof on the basis of FIGS. 2-5, in which:

DESCRIPTION OF THE INVENTION

Below, a description will be given of an exhaust-gas turbocharger which has a turbine housing, a bearing housing and a compressor housing, wherein the turbine housing has a coolant inlet, a cooling jacket arranged in the interior of the turbine housing, and a coolant outlet, and the cooling jacket is divided into two subregions.

Figure 1:
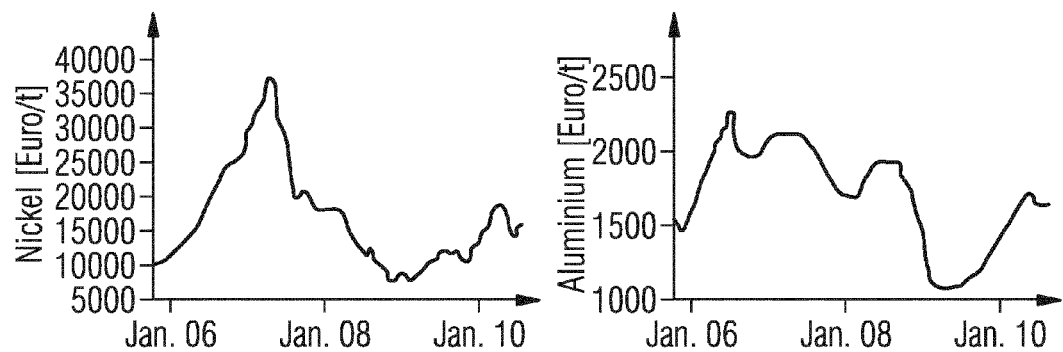
FIG. 1 shows the price development for nickel and aluminum in the last five years.
Figure 2:
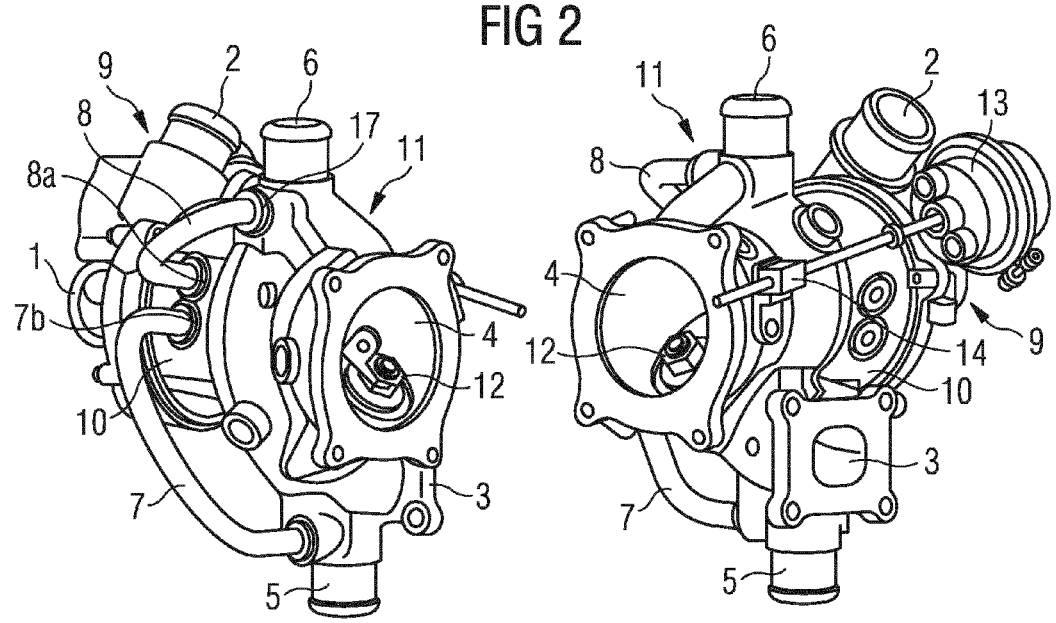
FIG. 2 shows perspective sketches illustrating an exhaust-gas turbocharger which has a wastegate and a water-cooled turbine housing.

It can be seen from FIG. 2 that the exhaust-gas turbocharger shown therein has a compressor housing 9, a bearing housing 10 and a turbine housing 11.

In the compressor housing 9, a compressor wheel is arranged on a common shaft in the conventional manner. In the turbine housing 11, a turbine wheel is arranged on the common shaft in the conventional manner. The common shaft is mounted in the bearing housing 10, which is positioned between the compressor housing 9 and the turbine housing 11. During operation of the exhaust-gas turbocharger, the turbine wheel is driven by means of an exhaust-gas mass flow of a connected internal combustion engine, and in turn drives the compressor wheel via the common shaft. The compressor compresses inducted fresh air and conducts said fresh air to the internal combustion engine.

The compressor housing 9 has a fresh-air inlet 1, through which fresh air is inducted into the exhaust-gas turbocharger from the environment, and a fresh-air outlet 2, through which compressed fresh air is discharged in order to be conducted onward to the internal combustion engine. Furthermore, the compressor housing 9 is provided with an overrun air recirculation valve (not shown in FIG. 2). Said overrun air recirculation valve has the task, during operation of the exhaust-gas turbocharger, of opening a bypass past the compressor in the event of a negative load step, such that excess charge pressure can be blown off.

The bearing housing 10 has a coolant inlet 7b and a coolant outlet 8a. During operation of the exhaust-gas turbocharger, coolant enters the bearing housing 10 through the coolant inlet 7b. During operation of the exhaust-gas turbocharger, coolant is discharged from the bearing housing 10 through the coolant outlet 8a. The coolant inlet 7b of the bearing housing 10 is connected to a hose 7 through which coolant is transported from the turbine housing 11 to the bearing housing 10. The coolant outlet 8a of the bearing housing 10 is connected to a hose 8 through which the coolant discharged from the bearing housing 10 is transported to the turbine housing 11.

The turbine housing 11 has an exhaust-gas inlet 3, an exhaust-gas outlet 4, a coolant inlet 5, a coolant outlet 6, a wastegate 12, a coolant branch outlet 16, and a coolant return inlet 17. The exhaust-gas inlet 3 is connected to an exhaust-gas outlet of the internal combustion engine with which the exhaust-gas turbocharger is associated, such that during operation, the hot exhaust gas of the internal combustion engine passes into the interior of the turbine housing 11 through the exhaust-gas inlet 3. There, said exhaust gas is conducted by a spiral arranged upstream of the turbine wheel, and then drives the turbine wheel. The turbine wheel in turn drives, via the common shaft, the compressor wheel arranged in the compressor housing. The exhaust gas exits the turbine housing 11 again through the exhaust-gas outlet 4, which is connected to the catalytic converter of the motor vehicle.

During operation of the exhaust-gas turbocharger, coolant, for example cooling water, enters through the coolant inlet 5 which is provided on the underside of the turbine housing 11. In the interior of the turbine housing, said coolant is divided between two subregions of a cooling jacket by means of tubular connections, flows through said subregions, is merged again by means of further tubular connections, and is finally discharged from the turbine housing 11 again through the coolant outlet 6 provided on the top side of the turbine housing 11. The turbine housing 11, which during operation of the exhaust-gas turbocharger is subjected to high temperatures owing to its positioning in the hot exhaust-gas flow, is actively cooled by said coolant. As a result of the arrangement of the coolant inlet 5 on the underside of the turbine housing and the arrangement of the coolant outlet 6 on the top side of the turbine housing, automatic degassing of the coolant is advantageously attained. Gas bubbles which could hinder the coolant flow are prevented from becoming stuck within the turbine housing.

For the regulation of the power of the turbine wheel, a wastegate 12 is integrated into the turbine housing 11. Said wastegate has a wastegate flap which, depending on the present demand, can be opened to a greater or lesser extent in order to conduct a desired fraction of the hot exhaust gas directly to the exhaust-gas outlet 4, bypassing the turbine wheel. The adjustment of the opening position of the wastegate flap is realized by means of a regulator 14 which is fastened to the outside of the turbine housing 11 and which is connected via a coupling rod to a pressure capsule 13.

Furthermore, the turbine housing 11 shown in FIG. 2 has a coolant branch outlet 16 which is connected to the hose 7. Coolant which is branched off within the turbine housing 11 is provided at said coolant branch outlet 16 and is transported through the hose 7 into the bearing housing via the coolant inlet 7b of the bearing housing 10. Furthermore, the turbine housing 11 shown in FIG. 2 has a coolant return inlet 17 which is connected to the hose 8. The coolant discharged from the bearing housing 10 is returned into the turbine housing 11 through said coolant return inlet 17.

Figure 3:
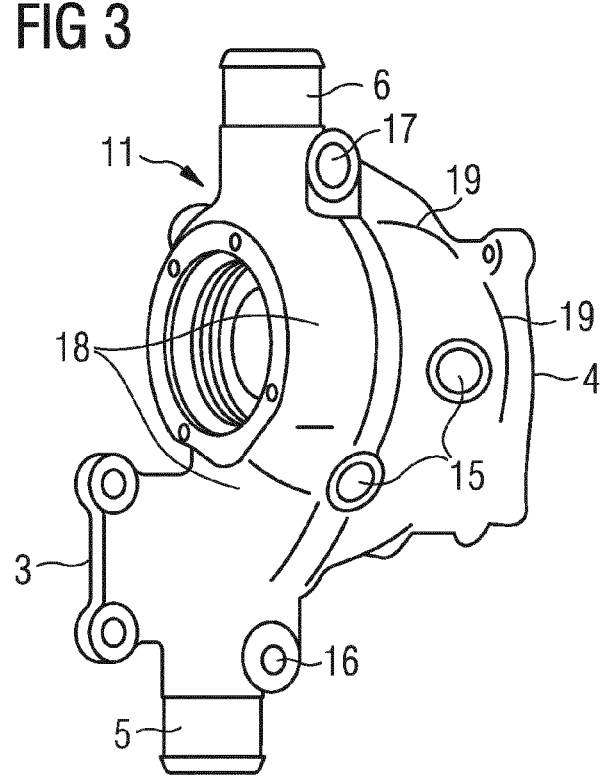
FIG. 3 shows a perspective sketch of a water-cooled turbine housing as a machined finished part.

FIG. 3 shows a perspective sketch of a turbine housing as a machined finished part. Said FIG. 3 in turn shows the coolant inlet 5 arranged on the underside of the turbine housing 11 and the coolant outlet 6 arranged on the top side of the turbine housing 11. Said positioning of the coolant inlet 5 and of the coolant outlet 6 corresponds to the later installation situation of the exhaust-gas turbocharger. It is ensured in this way that, during operation, the supply of coolant to the turbine housing always takes place from below, and the discharge of coolant always takes place at the top side of the turbine housing.

Furthermore, FIG. 3 shows the coolant branch outlet 16 and the coolant return inlet 17 of the turbine housing, wherein coolant is discharged to the bearing housing 10 via the coolant outlet 16 and the hose 7 shown in FIG. 2, and coolant discharged from the bearing housing 10 is returned to the turbine housing 11 via the coolant return inlet 17 and the hose 8 shown in FIG. 2. The coolant supply to the bearing housing accordingly takes place entirely via the turbine housing.

Furthermore, FIG. 3 shows casting apertures 15 which are required for stabilizing the core during the casting process. During casting, the core fills out the cooling jacket provided in the turbine housing, and said core must subsequently be removed again. The positions of the casting apertures 15 are dependent on the design and the stability of the cooling jacket. In the finished exhaust-gas turbocharger, the casting apertures are closed off by blind plugs.

Figure 4:
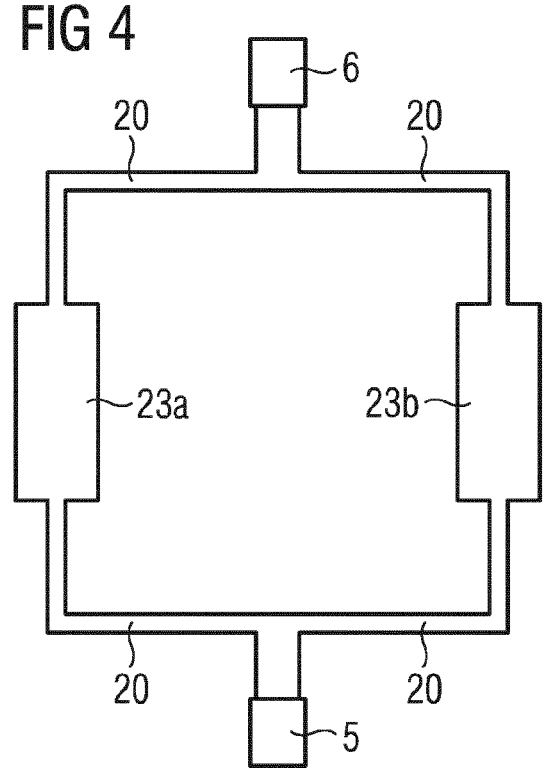
FIG. 4 shows a sketch illustrating the division of the cooling jacket into two subregions.

FIG. 4 shows a sketch illustrating the division of the cooling jacket, which is provided in the turbine housing 11, into two subregions. The coolant, which is cooling water and which is supplied to the turbine housing via its coolant inlet 5 provided on the underside thereof, is divided between two subregions 23a and 23b of a cooling jacket by means of tubular connections 20. The first subregion 23a of the cooling jacket is provided in the region of the spiral of the turbine housing. The second subregion 23b of the cooling jacket is provided in the region between the turbine wheel and the exhaust-gas outlet, specifically in the so-called outflow region of the turbine housing. The coolant flows exiting the subregions 23a and 23b are merged again using further tubular connections 20, and exit the turbine housing via its coolant outlet 6 which is provided at the top side of the turbine housing.

Figure 5:
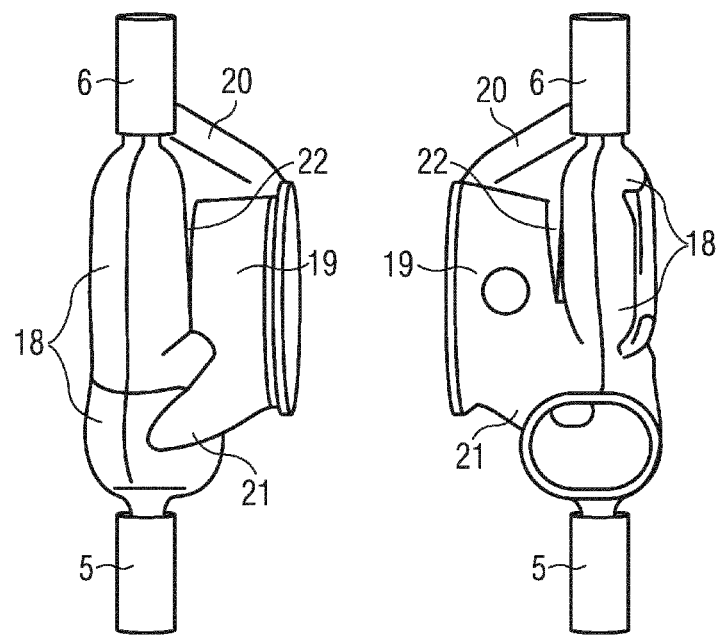
FIG. 5 shows sketches illustrating the two-part cooling jacket of a turbine housing with integrated tubular connections between the two subregions.

FIG. 5 shows further sketches illustrating the two-part cooling jacket of a turbine housing with integrated tubular connections between the two subregions. It is again possible to see the coolant inlet 5 arranged on the underside and the coolant outlet 6 provided on the top side. The main flow direction of the coolant within the turbine housing thus again runs from bottom to top. As a result of the division of the cooling jacket into two subregions, specifically a first subregion provided in the spiral region 18 of the turbine housing and a second subregion provided in the outflow region 19 of the turbine wheel, the complexity of the overall geometry through which the coolant flows is greatly reduced. The parting line 22 between the two subregions runs in a circumferential direction directly over the position of the turbine wheel. The coolant flow within the two subregions can be controlled in a simple manner. Backflow areas with stagnating coolant exchange can be substantially prevented from forming. The coolant flow is merged again by means of the tubular connections 20 mounted onto the two subregions at the top. Said tubular connections 20 in conjunction with the coolant outlet 6 arranged on the top side of the turbine housing permit the above-mentioned degassing of the outflow region. Furthermore, the stated tubular connections serve to stabilize the casting core which, during the casting process, fills out the cavity of what will later become the cooling jacket.

In the exemplary embodiment shown, the division of the coolant flow between the two subregions is realized by means of the wastegate duct provided. The overall concept however does not exclude the possibility of the coolant flow being divided by means of a further mounted tubular connection if necessary.

By means of the above described division of the cooling of the turbine housing into individual functional components of reduced complexity, the configuration and design process as a whole is greatly simplified.

Independently of this, it is possible for the direction of the coolant flow through the turbine housing to be reversed if the installation situation of the exhaust-gas turbocharger on the internal combustion engine is fundamentally changed.

Figure 6:
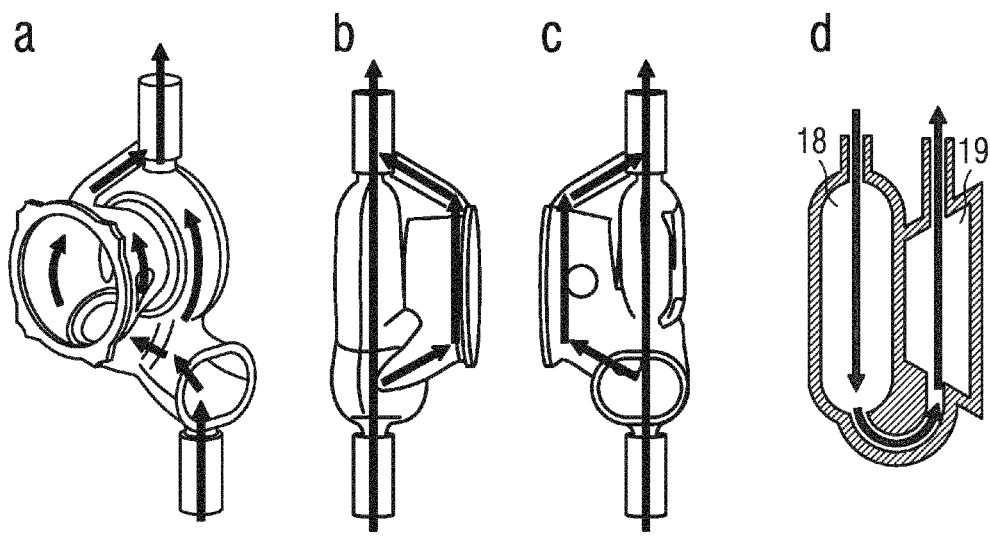
FIG. 6 shows sketches illustrating possible coolant flow guidance configurations within the turbine housing.

FIG. 6 shows sketches illustrating possible coolant flow guidance configurations within the turbine housing. FIGS. 6a, 6b and 6c illustrate that the two subregions, specifically the first subregion provided in the spiral region and the second subregion provided in the outflow region of the turbine wheel, are arranged parallel with respect to one another. The described concept of the division of the cooling jacket of the turbine housing into two subregions can advantageously also be realized if required by means of a modification of the tubular connections so as to produce a series connection of the two subregions. In this case, the result is a U-shaped throughflow as illustrated in FIG. 6b. In said figure, the spiral region is denoted by the reference numeral 18 and the outflow region is denoted by the reference numeral 19.

The invention claimed is:

1. An exhaust-gas turbocharger, comprising:
a turbine housing, a bearing housing; and a compressor housing;
said turbine housing having a coolant inlet formed therein, a cooling jacket inside said turbine housing, and a coolant outlet;
said cooling jacket within said turbine housing being divided into two subregions; and
said two subregions being connected to one another by way of tubular connections.

2. The exhaust-gas turbocharger according to claim 1, which comprises a spiral and a turbine wheel disposed in said turbine housing, and wherein a first of said two subregions of said cooling jacket is provided in a region of said spiral.

3. The exhaust-gas turbocharger according to claim 1, which comprises a spiral and a turbine wheel disposed in said turbine housing, and wherein a second of said subregions of said cooling jacket is provided in an outflow region of said turbine housing, which outflow region is situated between said turbine wheel and said coolant outlet.

4. The exhaust-gas turbocharger according to claim 1, which comprises a spiral and a turbine wheel disposed in said turbine housing, and wherein a first of said two subregions of said cooling jacket is provided in a region of said spiral, and a second of said subregions of said cooling jacket is provided in an outflow region of said turbine housing, which outflow region is situated between said turbine wheel and said coolant outlet.

5. The exhaust-gas turbocharger according to claim 1, wherein said coolant inlet is formed on an underside of said turbine housing.

6. The exhaust-gas turbocharger according to claim 1, wherein one of said tubular connections runs in a wastegate duct of said exhaust-gas turbocharger.

7. The exhaust-gas turbocharger according to claim 1, wherein said two subregions are arranged parallel to one another.

8. The exhaust-gas turbocharger according to claim 1, wherein said two subregions are arranged in series with respect to one another.

9. The exhaust-gas turbocharger according to claim 1, wherein said coolant outlet is formed on a top side of said turbine housing.

10. The exhaust-gas turbocharger according to claim 9, wherein said turbine housing has a branch line formed therein configured for branching off coolant supplied to said turbine housing, and wherein a first hose is disposed between said turbine housing and said bearing housing for supplying branched-off coolant to said bearing housing.

11. The exhaust-gas turbocharger according to claim 10, wherein a second hose extends between said bearing housing and said turbine housing, for conducting coolant back from said bearing housing to said turbine housing.

* * * * *